June 1, 1926.
J. H. ELLINGSWORTH
PARACHUTE APPARATUS
Filed Feb. 20, 1925    2 Sheets-Sheet 1
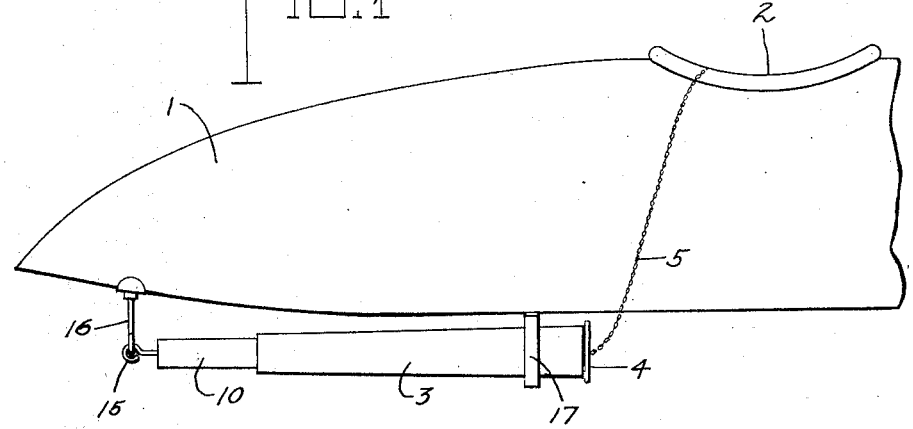
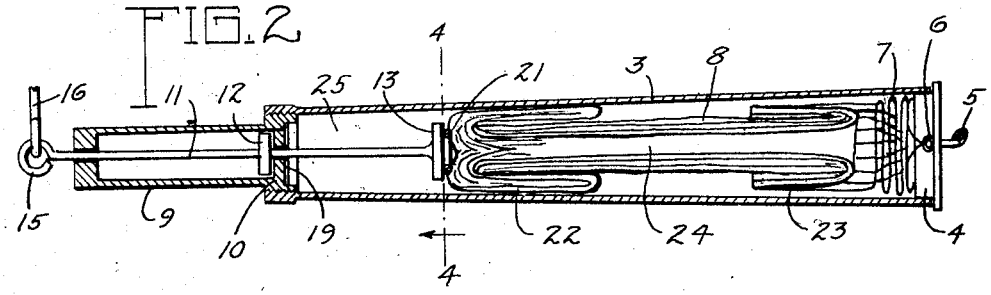
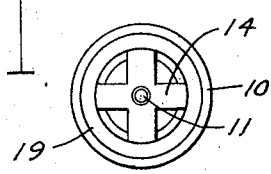
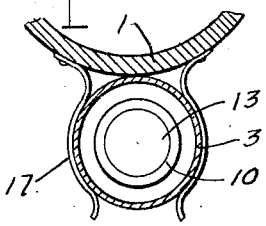
INVENTOR.
Joseph H. Ellingsworth,
BY Walter N. Haskell,
his ATTORNEY.

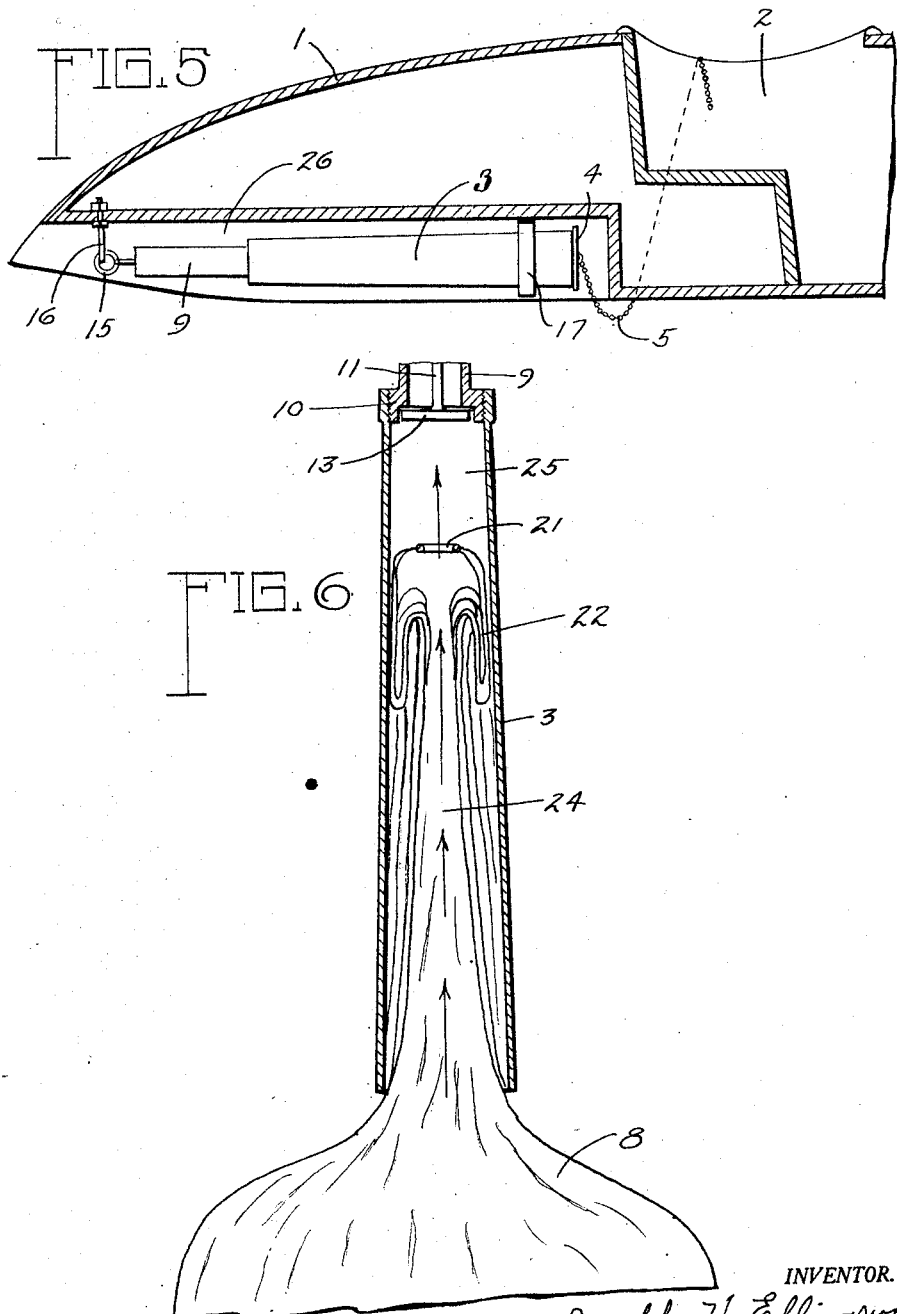

Patented June 1, 1926.

1,586,664

UNITED STATES PATENT OFFICE.

JOSEPH H. ELLINGSWORTH, OF EAST MOLINE, ILLINOIS.

PARACHUTE APPARATUS.

Application filed February 20, 1925. Serial No. 10,485.

My invention has reference to a parachute apparatus, and is designed more specially as a life-saving accessory for air-ships, and other air devices. In the present use of parachutes for such purposes, they fail to operate properly, or become damaged from fire, or from coming into contact with the air-ship, resulting in the death or serious injury of the user. In most cases the parachute is fastened to the person, who is supposed to leap from the air-ship, in case of danger, and after allowing a little time to elapse, operate the cord for causing the parachute to unfold. It is not always easy to calculate the period of time correctly, and the parachute and aeronaut fall to the earth together. At best, there is usually a drop of from one to three hundred feet before the parachute will begin to open properly, which in some cases would not give sufficient clearance, and which places an undue strain on the parachute.

One of the purposes of the present invention is to provide a container of fireproof construction, in which the parachute is stored, and from which it will be automatically released, upon need, and at a point farthest removed from danger of fire or contact with any part of the main machine.

Another object thereof is to provide a novel vacuum producing mechanism, which will retard the movement of the central part of the parachute, and cause the same to open quickly, then commence to fill instantly upon leaving the holder, so that it will be fully expanded in a drop of approximately twenty feet.

Another purpose thereof is to provide a place within the body of the aeroplane itself for the storage of the parachute and container so that it will not form an obstruction upon the side or bottom thereof.

In connection with the above named objects is a novel manner of folding the parachute, for storage in the holder, so as to assist in the operation of the device, and cause a prompt distension of the parachute.

The above-mentioned, and other features and advantages of the invention will more fully appear from the following specification, taken in connection with the accompanying drawings, in which:—

Fig. 1 shows the rear part of an air-ship body, with the invention attached thereto.

Fig. 2 is a longitudinal section of the invention, with the parachute shown in place therein.

Fig. 3 is an inner end view of the cylinder 10.

Fig. 4 is a cross-section on the broken line 4—4 of Fig. 2.

Fig. 5 is a view similar to Fig. 1, but in section, showing a different arrangement of the invention.

Fig. 6 is a longitudinal section of the casing 1, showing the manner of discharge of the parachute.

The reference number 1 indicates the rear part of the body of an air-ship, and 2 the cock-pit thereof. 3 is a metal casing, the walls of which flare outwardly towards one of its ends, and which end is provided with a plug 4, to the outer side of which is attached a chain or cable 5, leading into the cock-pit of the machine. On the the inner face of the plug 4 is fixed a ring 6, which may be also connected with the end of the chain 5, and to which are attached the cords 7 of a parachute 8, shown packed in compact space in the casing 3.

To the small end of the casing 3 is attached a cylinder 9, by means of a screw-plug 10 at the end thereof, and through said cylinder passes a rod 11, provided in said cylinder with a piston 12, and at its inner end with a disk 13, in the inner end of the casing 3. At the inner end of the cylinder 9 the rod 11 passes through a guide-plate 14, in the plug 10, and the outer end of said rod is formed into a ring 15, connected with the eye of a screw-bolt 16, secured in the lower face of the body 1, near the tail end thereof. At its larger end the casing 3 is releasably supported from the body 1 by means of spring arms 17. The inner face of the plug 10 is recessed to receive a gasket 19, against which the disk 13 seats at the furthest outward movement of the rod 11.

The parachute is shown provided at its center with the usual ring 21, providing an opening at that point, and the parts of the parachute adjacent thereto are folded as at 22, the folded portions forming a closure for such opening. The edge of the parachute is folded inwardly, as shown at 23, the cords which are attached thereto extending between such fold and the wall of the casing, aiding in preventing their becoming entangled with each other. The surplus portions of said cords are also carefully folded and packed in the end of the casing. The packing of the parachute is such as to leave a central space or channel in the center thereof, as at 24. The disk 13 also acts as a closure for the opening in the ring 21.

In practice, the chain 5 is attached to a belt or harness on the occupant of the airship, and in case of danger he throws himself overboard, his weight operating to first release the large end of the casing 3 from the arms 17, permitting the same to swing into a vertical position. The plug 4 is then pulled out by the weight of the user, and the cords 7 played out of the casing. As the weight is applied to the parachute there is a tendency to draw the casing 3 downwardly, a limited movement thereof being permitted by the rod 11 and piston thereon, the piston moving toward the outer end of the cylinder 9. This movement tends to draw the air in the inner end of the casing 3 into said cylinder, through openings in the guide-plate 14, resulting in a partial vacuum in the inner end of the casing. A suction is thus formed tending to hold the inner or central part of the parachute in place in the casing, and even draw it a little farther therein. This partial vacuum is maintained for the time being, by the disk 13 seating against the gasket 19, and preventing return of air from the cylinder 9. At the same time the outer or edge portion of the parachute is drawn outwardly and begins to fill immediately on leaving the casing, the flaring edges of the casing assisting in this operation. When the parachute is partially released the unfoldment of the folds 22 causes a withdrawal of such folds from the ring 21, permitting ingress of air through such ring to the space 25. By reason of the air compression beneath the released portion of the parachute 8, the air rushes very swiftly inwardly through the channel 24, not only effecting the release of the inner portion of the parachute, but tending to force the folds thereof outwardly against the sides of the casing, and assisting in the orderly unfolding thereof. By this operation a positive and quick discharge of the parachute is effected, the real operation thereof being almost instantaneous. This movement is also a progressive one, which insures the proper unfoldment of the parachute, and the immediate distension thereof. The foregoing recital contains what is considered to be the preferred method of packing and discharging a parachute in connection with the container therefor which is herein shown and set forth.

In Fig. 5 is shown a section of an air-ship body which is provided with a recess 26 in its lower part, in which the casing 3 is supported in the same manner as hereinbefore described. In this form the device does not project below the bottom of such body, and forms no obstacle when the machine is on the ground.

As before mentioned, the parachute is stored in a fire-proof container, and is positioned at a point where it is less liable to injury from fire, or from contact with the main machine. In case of a forced descent the air-ship usually moves downwardly in an inclined position, with the rear end uppermost, and by positioning the parachute at such rear end, it is farthest from the mechanism of the plane, and at a point where there is the greatest chance for a successful release of the parachute. These points are also in favor of the aeronaut who undertakes to prolong his life by these means.

By means of the threaded connection at the end of the cylinder 9, such cylinder and appurtenant parts can be released from the casing 3 when the parachute is being packed therein, so as to assist in properly placing the same from that end of the casing.

What I claim, and desire to secure by Letters Patent, is:—

1. In a parachute apparatus, a cylindrical casing swingingly attached at one of its ends to the body of an air-ship, and releasably connected therewith at its other end, and adapted for the storage of a parachute; and means for producing a suction in the inner end of said casing, to retard the movement of a parachute from such casing near said inner end.

2. In combination with the body of an air-ship, and recess in the lower part thereof, a casing pivotally supported at one of its ends in said recess, and releasably supported therein at its opposite end, said casing being adapted for the storage of a parachute; a plug for the discharge end of casing, having a flexible means of attachment with the occupant of such air-ship, and adapted for connection therewith of the cords of a parachute; and means for forming a suction in the inner end of said casing, coincidently with the discharge of a parachute therefrom, to retard the movement of the parachute near such inner end.

3. A parachute apparatus, comprising a casing, swingingly attached at one of its ends to the body of an air-ship, and releasably connected therewith at its opposite end, said casing having walls inclined outwardly toward its discharge end; and a vacuum device connected with the inner end of said casing, capable of being operated from the weight applied to said casing upon the release of a parachute therefrom, and capable of forming a suction in the inner end of said casing, to retard the movement of the parachute near such end of the casing.

4. In a parachute apparatus, a casing, adapted to have a parachute stored therein, and provided with walls inclined outwardly toward the discharge end thereof; an air cylinder at the small end of said casing provided with a rod and piston thereon, the end of said rod being adapted for pivotal connection with the body of an air-ship; and means for support of the opposite end of said casing from an air-ship so that the same will be automatically released upon a weight being applied to said casing, said air cylinder being in communication with the inner end of said casing, and adapted to cause a suction therein coincident with the discharge of a parachute from said casing.

5. In a parachute apparatus, a casing, adapted for the storage of a parachute; an air cylinder at one end thereof in communication therewith; a rod slidable in said cylinder, and projected into said casing, the outer end of said rod being adapted for a pivotal connection with the body of an air-ship; a piston on said rod within said cylinder; a disk on said rod in said casing, adapted to close the means of communication between said casing and cylinder, upon the piston reaching the end of its outward stroke; and means for connecting the other end of said casing with the body of an air-ship, so that the same will automatically release upon a weight being applied thereto.

6. In a parachute apparatus, a casing, adapted for the storage of a parachute, an air cylinder at one end thereof, in communication therewith; a rod movable in said cylinder and piston thereon, said rod being adapted for attachment to the body of an air-ship; and a parachute having a flexible connection with the occupant of an air-ship, and provided with a central opening, said parachute being adapted for packing in said casing with said opening innermost, and normally closed during the suction stroke of said piston, tending to hold the same in place in the casing, and capable of being opened following said suction movement, to permit the entry of air into the inner end of said casing, to overcome the suction therein.

In testimony whereof I affix my signature.

JOSEPH H. ELLINGSWORTH.